US012531352B2

(12) United States Patent
Arai et al.

(10) Patent No.: US 12,531,352 B2
(45) Date of Patent: Jan. 20, 2026

(54) ANTENNA MODULE

(71) Applicant: Murata Manufacturing Co., Ltd., Nagaokakyo (JP)

(72) Inventors: Kota Arai, Nagaokakyo (JP); Ryo Komura, Nagaokakyo (JP); Hideki Ueda, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 163 days.

(21) Appl. No.: 18/509,358

(22) Filed: Nov. 15, 2023

(65) Prior Publication Data

US 2024/0088574 A1 Mar. 14, 2024

Related U.S. Application Data

(63) Continuation of application No. PCT/JP2022/017092, filed on Apr. 5, 2022.

(30) Foreign Application Priority Data

May 18, 2021 (JP) ................................ 2021-083946

(51) Int. Cl.
*H01Q 21/24* (2006.01)
*H01Q 1/52* (2006.01)

(52) U.S. Cl.
CPC ............. *H01Q 21/24* (2013.01); *H01Q 1/523* (2013.01)

(58) Field of Classification Search
None
See application file for complete search history.

(56) References Cited

U.S. PATENT DOCUMENTS

2005/0200531 A1* 9/2005 Huang ................. H01Q 19/026 343/893
2014/0306846 A1* 10/2014 Nakatsu ................. H01Q 21/29 343/700 MS
2017/0365935 A1* 12/2017 Kashino ................. H01Q 21/24

FOREIGN PATENT DOCUMENTS

CN 114530692 A * 5/2022 ............... H01Q 1/50
JP H03-157006 A 7/1991
JP H04-154305 A 5/1992
JP H08-8639 A 1/1996
JP 2005-303986 A 10/2005
JP 2009-049608 A 3/2009
JP 2013-078027 A 4/2013
(Continued)

OTHER PUBLICATIONS

International Search Report and Written Opinion mailed on Jun. 28, 2022, received for PCT Application PCT/JP2022/017092, filed on Apr. 5, 2022, 10 pages including English Translation.

*Primary Examiner* — Crystal L Hammond
(74) *Attorney, Agent, or Firm* — XSENSUS LLP

(57) ABSTRACT

An antenna module includes a first sub array to a fourth sub array. The first sub array to the fourth sub array have a rectangular substrate. Each of the first sub array to the fourth sub array includes a plurality of radiation electrodes disposed along an extending direction of a long side. The first sub array to the fourth sub array are configured to radiate radio waves of the first polarized wave to the fourth polarized wave, respectively. The first polarized wave is different from the second polarized wave, and the third polarized wave is different from the fourth polarized wave. The first polarized wave is the same as the third polarized wave, and the second polarized wave is the same as the fourth polarized wave.

20 Claims, 11 Drawing Sheets

(56) References Cited

FOREIGN PATENT DOCUMENTS

| | | | | |
|---|---|---|---|---|
| JP | 2016-522610 | A | 7/2016 | |
| JP | 2016-213927 | A | 12/2016 | |
| JP | 2018-186337 | A | 11/2018 | |
| WO | WO-2019012732 | A1 * | 1/2019 | ............ H01Q 13/08 |
| WO | WO-2019102988 | A1 * | 5/2019 | ............ H01Q 21/06 |

* cited by examiner

ANTENNA MODULE

CROSS-REFERENCE TO RELATED APPLICATIONS

This is a continuation application of PCT/JP2022/017092, filed on Apr. 5, 2022, designating the United States of America, which is based on and claims priority to Japanese Patent Application No. JP 2021-083946 filed on May 18, 2021. The entire contents of the above-identified applications, including the specifications, drawings and claims, are incorporated herein by reference in their entirety.

TECHNICAL FIELD

The present disclosure relates to an antenna module having a plurality of sub arrays, and more specifically relates to a technology for improving antenna characteristics.

BACKGROUND ART

In general, Japanese Unexamined Patent Publication No. 2016-213927 (Patent Document 1) discloses a configuration of an array antenna in which a plurality of antenna elements are arranged. A plurality of sub arrays may be used to form the array antenna as described in Japanese Unexamined Patent Publication No. 2016-213927 (Patent Document 1).

For example, it is conceivable that a configuration in which two radiation electrodes are disposed on one dielectric substrate is defined as a single sub array. An array antenna can be formed by arranging a plurality of corresponding sub arrays on a support substrate.

CITATION LIST

Patent Document

Patent Document 1: Japanese Unexamined Patent Application Publication No. 2016-213927

SUMMARY

Technical Problem

However, there is a case that in the sub array in which two radiation electrodes are disposed on one dielectric substrate, the directivity of the radiation pattern of the radio waves radiated by the sub array may be biased depending on the radiation direction of the radio waves. For example, when the dielectric substrate constituting the sub array is viewed in plan view, the dielectric substrate may have a flat plate shape having a long side and a short side. In this case, at least one of the plurality of radiation electrodes disposed on the dielectric substrate is disposed at positions shifted from the center position of the dielectric substrate when the dielectric substrate is viewed in plan view.

In the radiation electrode disposed at the positions shifted from the center position of the dielectric substrate, the symmetry of the radiation pattern of the radiation electrode may be impaired. Since the radiation electrode having the radiation pattern whose symmetry is impaired in the sub array is included, a bias may occur in the directivity of the radiation pattern as the sub array. When the array antenna is formed using the sub array in which such a bias occurs in the directivity of the radiation pattern, there is a possibility that the symmetry of the radiation pattern in the entire array antenna is not ensured.

The present disclosure is made to solve such a problem, and the object thereof is to improve the symmetry of the radiation pattern as the array antenna as a whole in an antenna module formed of a plurality of sub arrays and to improve antenna characteristics.

Solution to Problem

The present disclosure provides an antenna module including a flat support substrate, a first sub array, a second sub array, a third sub array, and a fourth sub array. The first sub array, the second sub array, the third sub array, and the fourth sub array have a rectangular substrate that is disposed on a support substrate and includes a long side and a short side when the support substrate is viewed in plan view. Each of the first sub array, the second sub array, the third sub array, and the fourth sub array includes a plurality of radiation electrodes disposed along an extending direction of the long side. The first sub array can radiate radio waves of a first polarized wave, and the second sub array can radiate radio waves of a second polarized wave.

The third sub array can radiate radio waves of a third polarized wave, and the fourth sub array can radiate radio waves of a fourth polarized wave. The first polarized wave is different from the second polarized wave, and the third polarized wave is different from the fourth polarized wave. The first polarized wave is the same as the third polarized wave, and the second polarized wave is the same as the fourth polarized wave.

Effects

According to the present disclosure, the antenna module is formed by a plurality of sub arrays, in which the first sub array having a radiation electrode that radiates radio waves of the first polarized wave, the second sub array having a radiation electrode that radiates radio waves of the second polarized wave, the third sub array having a radiation electrode that radiates radio waves of the third polarized wave, and the fourth sub array having a radiation electrode that radiates radio waves of the fourth polarized wave are individually disposed on the support substrate. Each of the sub arrays is disposed on the support substrate such that the first polarized wave and the third polarized wave are disposed differently with respect to the second polarized wave and the fourth polarized wave. With such a configuration, it is possible that the polarized waves of all the sub arrays among the plurality of sub arrays disposed on the support substrate are not in the same direction, so that a bias of the radiation pattern of the entire array antenna is prevented from being promoted, and the characteristics of the antenna are improved.

DESCRIPTION OF EMBODIMENTS

Figure 1:
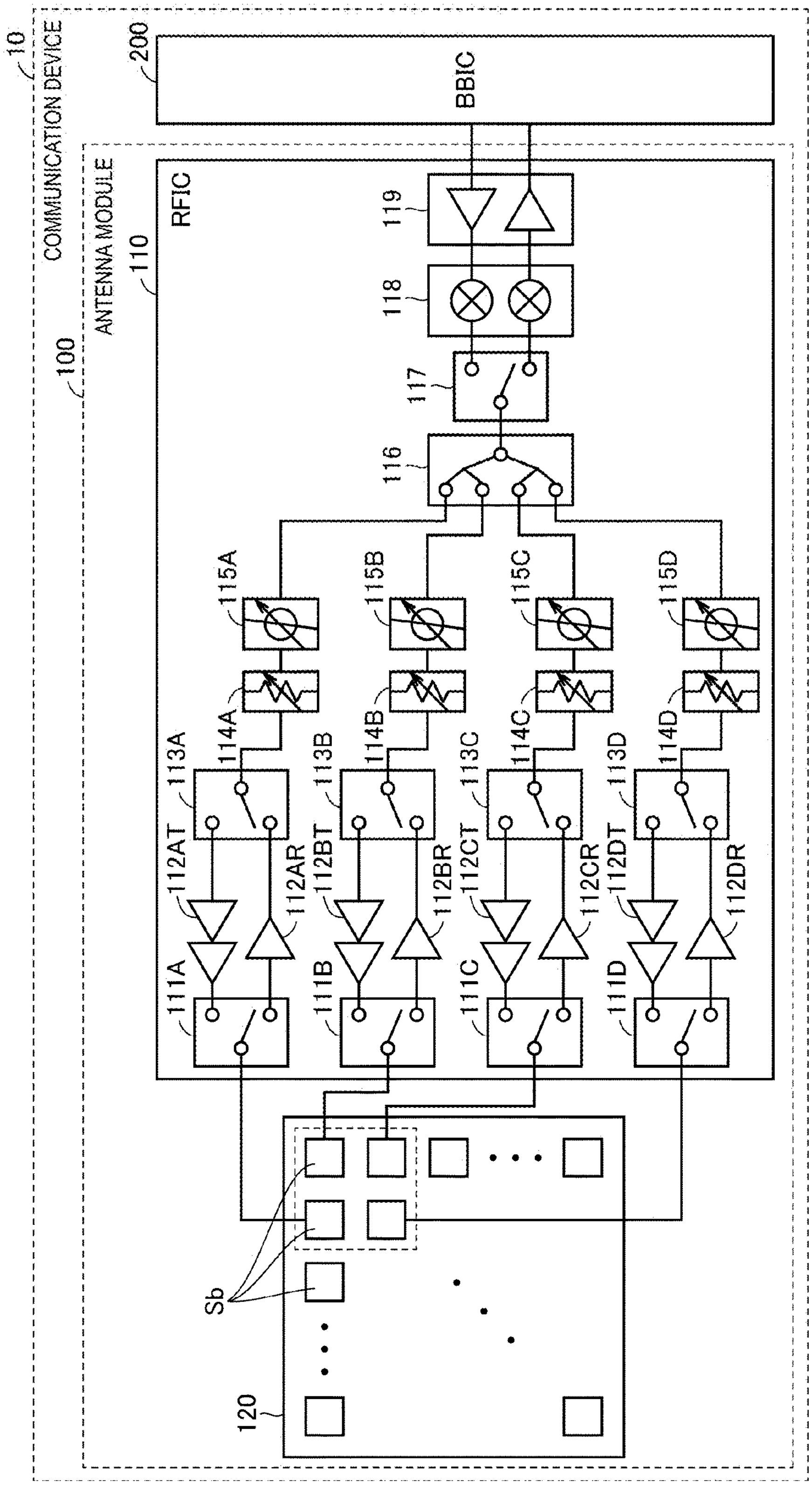
FIG. 1 is an example of a block diagram of a communication device 10 to which an antenna module according to a first embodiment is applied.

Hereinafter, embodiments of the present disclosure will be described in detail with reference to the accompanying drawings. The same or corresponding parts in the drawings are denoted by the same reference numerals, and the description is not repeated.

First Embodiment

<Basic Configuration of Communication Device>

FIG. 1 is an example of a block diagram of a communication device 10 to which an antenna module 100 according to a first embodiment is applied. The communication device 10 is, for example, a mobile terminal such as a mobile phone, a smartphone, or a tablet, a personal computer having a communication function, or the like. An example of a frequency bandwidth of radio waves used in the antenna module 100 according to the present embodiment is, for example, a radio wave in a millimeter wave band having a center frequency of 28 GHz, 39 GHz, 60 GHz, or the like, but is applicable to radio waves in frequency bandwidths other than the above-mentioned.

Referring to FIG. 1, the communication device 10 includes the antenna module 100 and a BBIC 200 that configures a baseband signal processing circuit. The antenna module 100 includes an RFIC 110 that is an example of a feed circuit and an antenna device 120. The communication device 10 upconverts a signal transmitted from the BBIC 200 to the antenna module 100 to a radio frequency signal and radiates the signal from the antenna device 120, and downconverts a radio frequency signal received at the antenna device 120 and processes the signal at the BBIC 200.

In FIG. 1, for easy description, a configuration corresponding to four sub arrays Sb in a plurality of sub arrays Sb constituting the antenna device 120 is illustrated, and a configuration corresponding to the other sub array Sb having the same configuration is omitted. The sub array Sb can include a plurality of radiation electrodes. In the first present embodiment, the radiation electrode included in the sub array Sb is a patch antenna having a substantially square flat plate shape.

The RFIC 110 includes switches 111A to 111D, 113A to 113D, and 117, power amplifiers 112AT to 112DT, low noise amplifiers 112AR to 112DR, attenuators 114A to 114D, phase shifters 115A to 115D, a signal multiplexing/branching filter 116, a mixer 118, and an amplifier circuit 119.

Based on the radio frequency signal being transmitted, the switches 111A to 111D and 113A to 113D are switched to the side of the power amplifier 112AT to 112DT, and the switch 117 is coupled to the transmission side amplifier of the amplifier circuit 119. Based on a radio frequency signal being received, the switches 111A to 111D and 113A to 113D are switched to the side of the low noise amplifier 112AR to 112DR, and the switch 117 is coupled to the reception side amplifier of the amplifier circuit 119.

The signal transmitted from the BBIC 200 is amplified by the amplifier circuit 119 and upconverted by the mixer 118. The transmission signal, which is an upconverted radio frequency signal, is divided into four waves by the signal multiplexing/branching filter 116, which pass through four signal paths and are fed to the different sub arrays Sb, respectively. At this time, the directivity of the antenna device 120 can be adjusted by individually adjusting the phase shift degrees of the phase shifters 115A to 115D disposed in each signal path.

The received signals, which are radio frequency signals received by the radiation electrode of each of the sub arrays Sb, pass through four different signal paths, respectively, and are multiplexed by the signal multiplexing/branching filter 116. The multiplexed received signal is downconverted by the mixer 118, amplified by the amplifier circuit 119, and transmitted to the BBIC 200.

The RFIC 110 is formed as, for example, as a one-chip integrated circuit component including the above-described circuit configuration. Alternatively, the apparatus (switch, power amplifier, low noise amplifier, attenuator, and phase shifter) corresponding to each of the sub arrays Sb in the RFIC 110 may be formed as a one-chip integrated circuit component for each of the corresponding sub arrays Sb.

<Configuration of Antenna Module>

Figure 2:
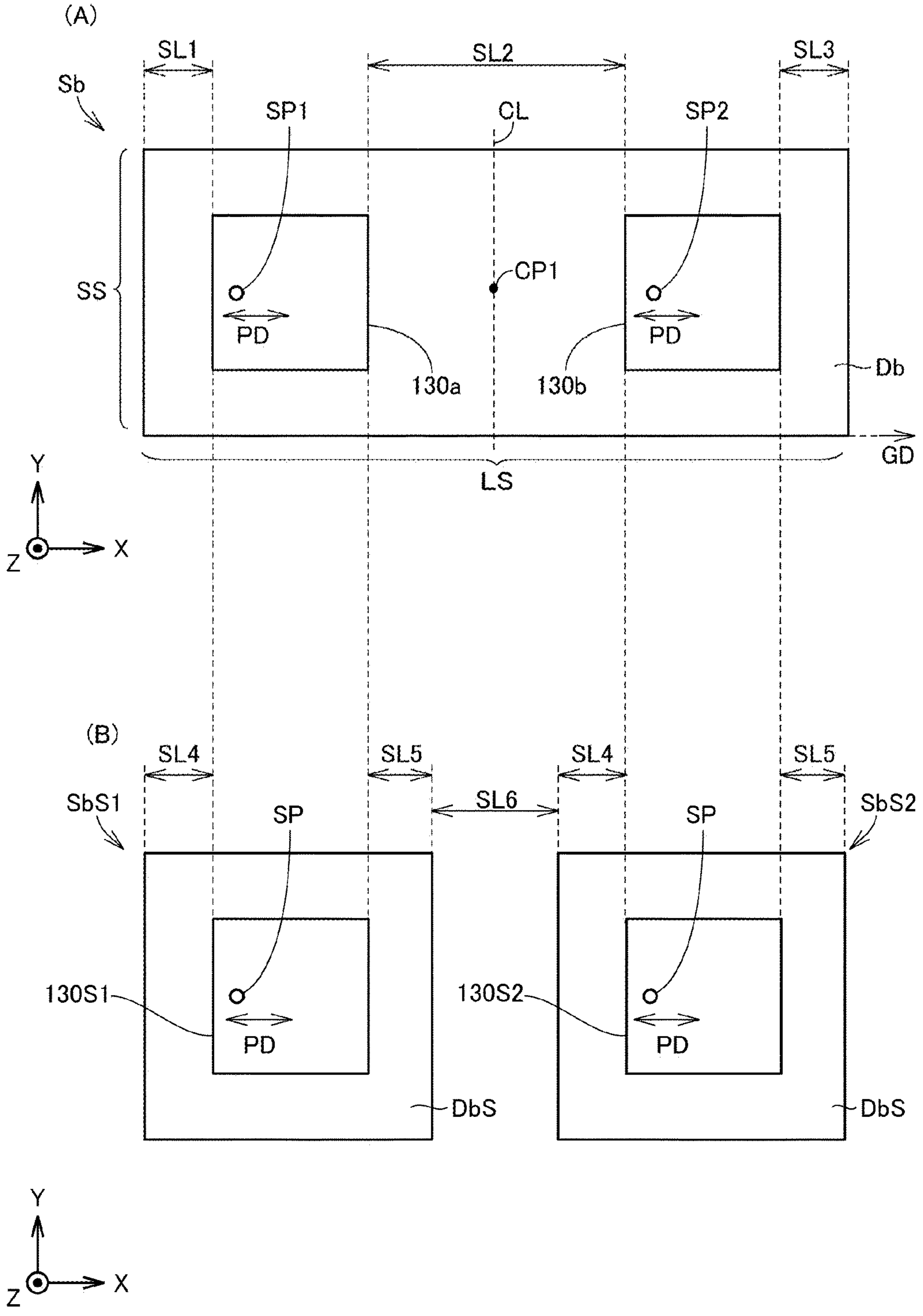
FIG. 2 is a plan view of a sub array according to the first embodiment (FIG. 2(A)) and a plan view of a sub array of a comparative example (FIG. 2 (B)).

Next, the details of the configuration of the sub array Sb included in the antenna module 100 according to the first embodiment will be described with reference to FIG. 2. FIG. 2 is a plan view of the sub array Sb according to the first embodiment (FIG. 2(A)) and a plan view of a sub array SbS of a comparative example (FIG. 2 (B)). In the following description, the positive direction of the Z-axis in each drawing may be referred to as an upper surface side, and the negative direction may be referred to as a lower surface side.

Referring to FIG. 2, the sub array Sb includes a flat dielectric substrate db, and includes a radiation electrode 130*a* and a radiation electrode 130*b* on the front surface of the dielectric substrate db on the positive direction side of the Z-axis. The number of radiation electrodes included in the sub array Sb is not limited to two, and the sub array Sb may include, for example, three or more radiation electrodes.

The dielectric substrate db is a rectangular flat plate substrate and has a long side LS and a short side SS. The radiation electrodes 130*a* and 130*b* are patch antennas having a substantially square flat plate shape, and are disposed side by side along an extending direction GD of the long side LS. In other words, in FIG. 2(A), the radiation electrodes 130*a* and 130*b* are disposed adjacent to each other in the X-axis direction. In addition, the extending direction GD is the same direction as the arrangement direction of the radiation electrodes 130*a* and 130*b*. A point CP1 is the center point of the dielectric substrate db when the dielectric substrate db is viewed in plan view. The line CL is a line parallel to the Y-axis passing through the point CP1. The radiation electrodes 130*a* and 130*b* are disposed to be left-right symmetrical with the line CL as an axis. In other words, the radiation electrodes 130*a* and 130*b* are line symmetrical with the line CL as the axis.

Wirings (not illustrated) are respectively coupled to the feeding point SP1 of the radiation electrode 130*a* and the feeding point SP2 of the radiation electrode 130*b* of the sub array Sb from the negative direction side of the Z-axis. In the coupling of the radiation electrodes 130*a* and 130*b* to the wiring, the wiring may be directly coupled to the radiation electrodes 130*a* and 130*b*, or may be coupled in a non-contact manner by capacitance coupling.

The feeding points SP1 and SP2 of the radiation electrodes 130*a* and 130*b* are disposed at positions offset in the negative direction of the X-axis from the centers of the radiation electrodes 130*a* and 130*b*, respectively. By disposing the feeding point at such a position, each radiation electrode radiates a radio wave of a polarized wave PD parallel to the X-axis. A polarized wave means a direction in which an electric field vibrates. The polarized wave PD is a linearly polarized wave and is a polarized wave in a direction along the extending direction GD.

An interval SL1 indicates the distance from the end portion of the X-axis on the negative direction side in the dielectric substrate db to the radiation electrode 130*a*. The interval SL1 has a length of, for example, λ/4. An interval SL2 indicates the distance between the radiation electrode 130*a* and the radiation electrode 130*b*. An interval SL3 indicates the distance from the end portion of the X-axis on the positive direction side of the dielectric substrate db to the radiation electrode 130*b*. The interval SL3 has a length of, for example, λ/4.

The dielectric substrate db is, for example, a low temperature co-fired ceramics (LTCC) multilayer substrate, a multilayer resin substrate formed by laminating a plurality of resin layers configured with a resin such as epoxy or polyimide, a multilayer resin substrate formed by laminating a plurality of resin layers configured with a liquid crystal polymer (LCP) having a lower dielectric constant, a multilayer resin substrate formed by laminating a plurality of resin layers configured with a fluororesin, or a ceramic multilayer substrate other than LTCC. The dielectric substrate db does not have to necessarily have a multilayer structure, and may be a single layer substrate. In addition, the conductor constituting the via or the like forming the radiation electrode and the feeding wiring is formed of metal mainly constituted with aluminum (Al), copper (Cu), gold (Au), silver (Ag), and an alloy thereof.

FIG. 2(B) illustrates a sub array SbS1 in which a single radiation electrode 130S1 is disposed and a sub array SbS2 in which a single radiation electrode 130S2 is disposed, for comparison with the sub array Sb in the first embodiment. Two of the sub array SbS1 and the sub array SbS2 are disposed adjacent to each other in the X-axis direction. The sub array SbS2 and the sub array SbS1 have the same configuration. Therefore, hereinafter, the configuration of the sub array SbS1 will be described, and the description of the configuration of the sub array SbS2 will not be repeated.

The sub array SbS1 includes a square dielectric substrate DbS when viewed in plan view from the positive direction side of the Z-axis, and includes the single radiation electrode 130S1 on the front surface of the dielectric substrate DbS on the positive direction side of the Z-axis. The radiation electrode 130S1 is disposed such that the center of the radiation electrode 130S1 overlaps the center of the dielectric substrate DbS when viewed in plan view from the positive direction side of the Z-axis. The radiation electrode 130S1 has the same shape as the radiation electrodes 130*a* and 130*b* illustrated in FIG. 2(A).

The feeding point SP of the radiation electrode 130S1 is disposed at a position offset in the negative direction of the X-axis from the center of the radiation electrode 130S1. As a result, the radiation electrode 130S1 radiates radio waves of the polarized wave PD parallel to the X-axis, similarly to the radiation electrodes 130*a* and 130*b* in FIG. 2 (A). An interval SL4 indicates the distance from the end portion of the X-axis on the negative direction side in the dielectric substrate DbS to the radiation electrode 130S1. An interval SL5 indicates the distance from the end portion of the X-axis on the positive direction side in the dielectric substrate db to the radiation electrode 130S1. An interval SL6 indicates the distance between the dielectric substrate DbS of the sub array SbS1 and the dielectric substrate DbS of the sub array SbS2. The distance between the radiation electrode 130S1 and the radiation electrode 130S2 in FIG. 2(B) is the same distance as the distance between the radiation electrode 130*a* and the radiation electrode 130*b* in FIG. 2 (A). In other words, the interval SL2 is a distance obtained by adding the interval SL4, the interval SL5, and the interval SL6.

Figure 3:
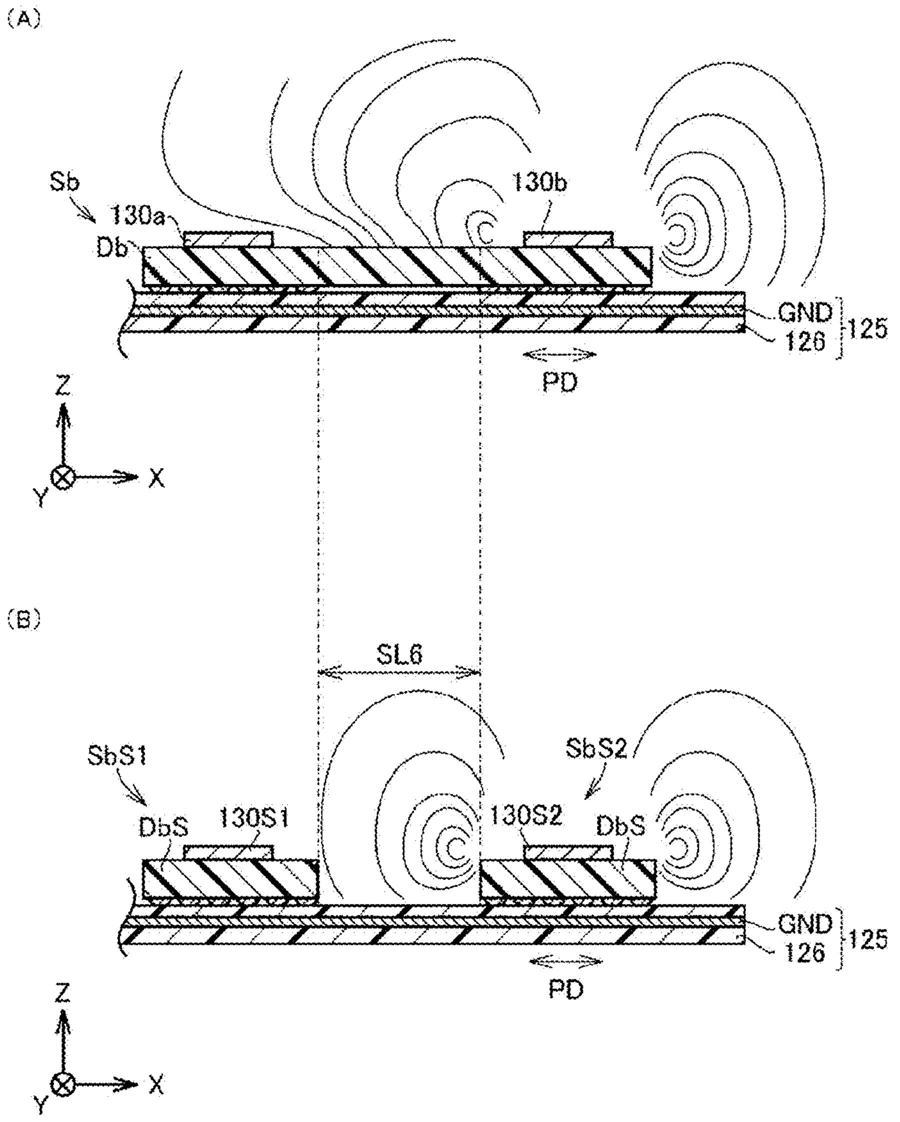
FIG. 3 is a diagram comparing radiation patterns in polarized waves (X-axis direction) of a radiation electrode of the sub array according to the first embodiment illustrated in FIG. 2 and a radiation electrode of the sub array of the comparative example.

FIG. 3 is a diagram for comparing the radiation patterns in the polarized wave PD (X-axis direction) of the radiation electrode 130*b* of the sub array Sb according to the first embodiment illustrated in FIG. 2 and the radiation electrode 130S2 of the sub array SbS2 of the comparative example. FIG. 3(A) is a diagram of the sub array Sb according to the first embodiment when the sub array Sb is side-viewed from the negative direction side of the Y-axis. FIG. 3(B) is a diagram of the sub array SbS1 and the sub array SbS2 of the comparative example when the sub array SbS1 and the sub array SbS2 are side-viewed from the negative direction side of the Y-axis.

In FIG. 3(A), the radiation pattern in the X-axis direction of the radio waves radiated by the radiation electrode 130*b* is illustrated as contour lines. In FIG. 3(B), the radiation pattern in the X-axis direction of the radio waves radiated by the radiation electrode 130S2 is illustrated as contour lines.

In FIG. 3, similarly to FIG. 2, the distance between the radiation electrode 130*a* and the radiation electrode 130*b* is the same distance as the distance between the radiation electrode 130S1 and the radiation electrode 130S2. While in FIG. 3(B), the interval SL6 between the sub array SbS1 and the sub array SbS2 is empty, in FIG. 3(A), the dielectric substrate db is disposed at a position corresponding to the interval SL6.

Each of the sub arrays Sb illustrated in FIG. 3(A) and the sub arrays SbS1 and SbS2 illustrated in FIG. 3(B) is disposed on a flat support substrate 125. The support substrate 125 includes a ground electrode GND and a dielectric 126. Solder bumps are disposed between the sub arrays Sb, SbS1, and SbS2 and the support substrate 125. The RFIC 110 (not illustrated in FIG. 3) can be disposed on the negative direction side of the Z-axis of the support substrate 125. The ground electrode GND does not have to be disposed in the support substrate 125. For example, based on the support substrate 125 being an intermediate member such as an interposer substrate, the ground electrode GND may be disposed in a mother substrate (not illustrated).

In the sub array SbS2 illustrated as the comparative example, the dielectric substrate DbS of the sub array SbS2 has a square flat plate shape, and the radiation electrode 130S2 similarly has a square flat plate shape. In addition, the radiation electrode 130S2 is disposed on the dielectric substrate DbS such that the center of the radiation electrode 130S2 overlaps the center of the dielectric substrate DbS. As a result, as illustrated in FIG. 3(B), the radiation pattern in the polarized wave PD of the radio wave radiated by the radiation electrode 130S2 is a radiation pattern having good symmetry.

On the other hand, in the first embodiment illustrated in FIG. 3(A), the dielectric substrate db has a flat plate shape having the long side LS and the short side SS, and two of the radiation electrodes 130*a* and 130*b* are disposed on the dielectric substrate db. The radiation electrode 130*a* is disposed at a position offset in the X-axis direction from the point CP1 when the dielectric substrate db is viewed in plan view.

For this reason, as illustrated in FIG. 3(A), the symmetry of the radiation pattern in the X-axis direction is impaired. This is because the disposition relationship between the dielectric substrate db and the radiation electrode 130*b* in the X-axis direction is different from the disposition relationship between the dielectric substrate DbS and the radiation electrode 130S2 in the X-axis direction. In addition, the symmetry is similarly impaired in the radiation pattern of the radiation electrode 130*a* in the X-axis direction.

The radiation electrode 130*a* and the radiation electrode 130*b* are disposed to be left-right symmetrical with the line CL as an axis. Therefore, the radiation pattern of the radiation electrode 130*a* in the X-axis direction is also formed to be left-right symmetrical with respect to the radiation pattern of the radiation electrode 130*b* in the X-axis direction illustrated in FIG. 2 with the line CL as an axis.

That is, the symmetry of the radiation patterns of the radiation electrode 130*a* is impaired, similarly to the radiation pattern of the radiation electrode 130*b* illustrated in FIG. 2(A). As a result, the directivity of the radiation pattern in the X-axis direction as the sub array Sb formed by the radiation pattern of the radiation electrode 130*a* and the radiation pattern of the radiation electrode 130*b* whose symmetry is impaired is decreased. That is, the radiation pattern in the X-axis direction as the sub array Sb illustrated in FIG. 2(A) is in decreased directivity as compared with the radiation patterns of the sub array SbS1 and the sub array SbS2 in the X-axis direction illustrated in FIG. 2(B).

On the other hand, based on the focus being on the radiation pattern in the Y-axis direction, the radiation pattern in the Y-axis direction as the sub array Sb illustrated in FIG. 2(A) is not in decreased directivity as compared with the radiation patterns of the sub array SbS1 and the sub array SbS2 in the Y-axis direction illustrated in FIG. 2(B). As shown in FIGS. 2(A) and 2(B), this is because the disposition relationship between the dielectric substrate db and the radiation electrode 130*b* in the Y-axis direction is the same as the disposition relationship between the dielectric substrate DbS and the radiation electrode 130S2 in the Y-axis direction.

In short, in the sub array Sb illustrated in FIG. 2(A), the symmetry of the radiation patterns of the radiation electrodes 130*a* and 130*b* in the X-axis direction is impaired, and the symmetry of the radiation pattern in the Y-axis direction is not impaired. Therefore, in the radiation pattern of the sub array Sb, the directivity is in an unbalanced state between the X-axis direction and the Y-axis direction.

Hereinafter, the antenna device 120 that improves the symmetry of the radiation pattern as the array antenna as a whole and improves antenna characteristics although an array antenna is formed by using the sub array Sb in which the radiation pattern of the polarized wave (X-axis direction) and the directivity in the direction (Y-axis direction) orthogonal to the polarized wave are unbalanced, will be described.

Figure 4:
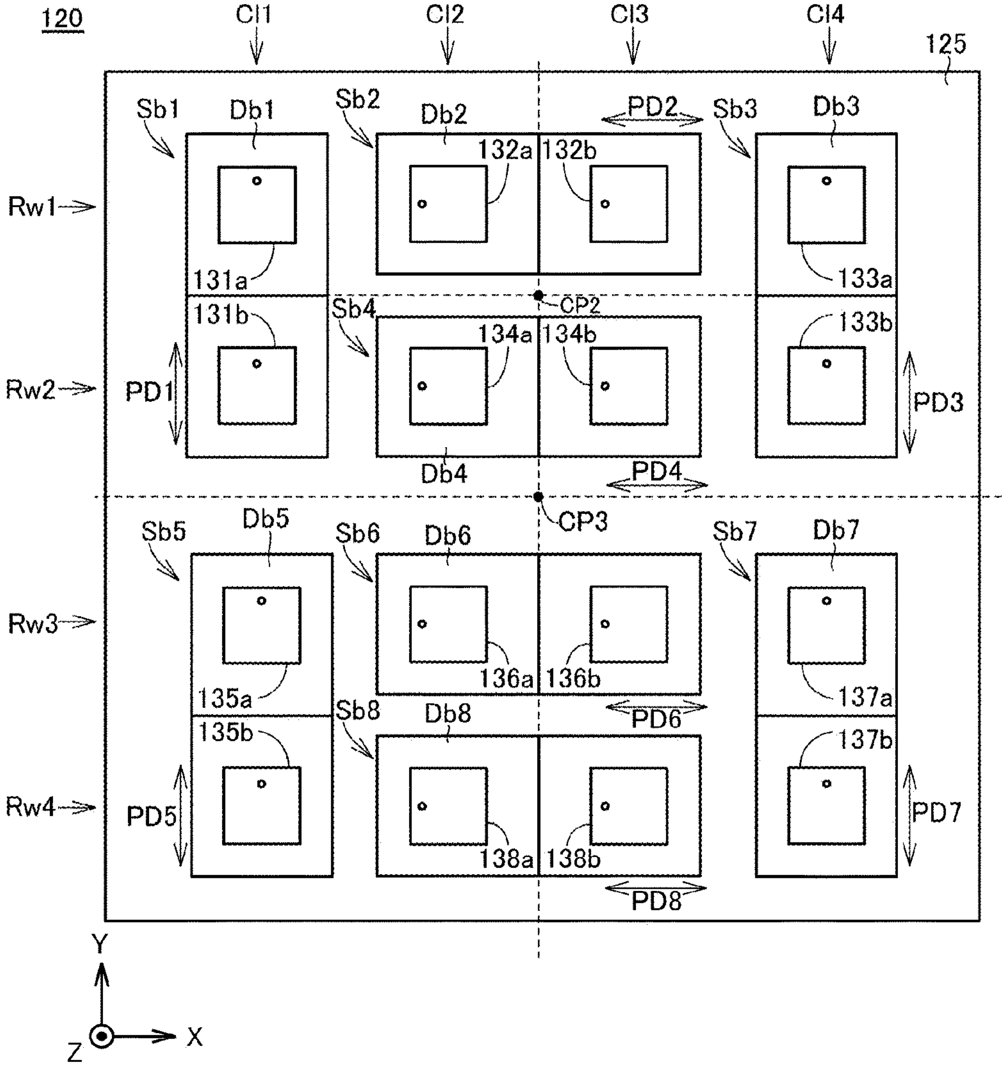
FIG. 4 is a diagram illustrating an antenna device according to the first embodiment.

FIG. 4 is a diagram illustrating the antenna device 120 according to the first embodiment. In the antenna device 120 according to the first embodiment, the plurality of sub arrays Sb are disposed on the flat support substrate 125 and the front surface of the support substrate 125 in the positive direction side of the Z-axis. Each of the plurality of sub arrays Sb disposed on the support substrate 125 has the same configuration as the sub array Sb illustrated in FIGS. 2(A) and 3(A). Hereinafter, to distinguish each of the plurality of sub arrays Sb disposed on the support substrate 125, for convenience, each of the plurality of sub arrays Sb is attached with a different reference numeral. The radiation electrodes included in the plurality of sub arrays Sb disposed on the support substrate 125 are also similarly attached with different reference numerals.

The sub array Sb1 to the sub array Sb8 are disposed on the support substrate 125. All of the radiation electrodes 131*a*, 131*b* to 138*a*, and 138*b* included in the sub array Sb1 to the sub array Sb8 are disposed to form a matrix on the support substrate 125. In other words, the radiation electrodes 131*a*, 131*b* to 138*a*, and 138*b* are disposed to form a column in the Y-axis direction and form a row in the X-axis direction. That is, the radiation electrodes 131*a*, 131*b*, 135*a*, and 135*b* are disposed on a column C11. Radiation electrodes 132*a*, 134*a*, 136*a*, and 138*a* are disposed on a column C12. The radiation electrodes 132*b*, 134*b*, 136*b*, and 138*b* are disposed on a column C13. The radiation electrodes 133*a*, 133*b*, 137*a*, and 137*b* are disposed on a column C14.

The radiation electrodes 131*a*, 132*a*, 132*b*, and 133*a* are disposed on a row Rw1. The radiation electrodes 131*b*, 134*a*, 134*b*, and 133*b* are disposed on a row Rw2. The radiation electrodes 135*a*, 136*a*, 136*b*, and 137*a* are disposed on a row Rw3. The radiation electrodes 135*b*, 138*a*, 138*b*, and 137*b* are disposed on a row Rw4. In other words, the radiation electrodes 131*a*, 131*b* to 138*a*, and 138*b* form a matrix of four rows and four columns. In addition, four radiation electrodes in total are disposed in each row and each column in the matrix.

The sub arrays Sb1, Sb3, Sb5, and Sb7 are disposed such that the extending direction GD of the long side LS is parallel to the Y-axis direction. Therefore, a polarized wave PD1 of the radio waves radiated by the radiation electrode 131*a* and the radiation electrode 131*b* included in the sub array Sb1 is in a direction parallel to the Y-axis.

Hereinafter, the polarized wave PD1 of the radio waves radiated by the radiation electrode 131*a* and the radiation electrode 131*b* is simply referred to as the "polarized wave PD1 of the sub array Sb1".

As shown in FIG. 4, the polarized wave PD1 of the sub array Sb1, a polarized wave PD3 of the sub array Sb3, a polarized wave PD5 of the sub array Sb5, and a polarized wave PD7 of the sub array Sb7 are in a direction parallel to the Y-axis. That is, the polarized waves PD1, PD3, PD5, and PD7 are the same polarized waves as each other. Each of the polarized waves PD1, PD3, PD5, and PD7 does not have to be in a direction completely parallel to the Y-axis. For example, the polarized wave PD1 may be inclined by a predetermined angle from a direction parallel to the Y-axis. Even in this case, the polarized wave PD1 is referred to as being the same polarized wave as the polarized wave PD3, the polarized wave PD5, and the polarized wave PD7 in the present embodiment. The predetermined angle is, for example, an angle of less than 30 degrees. That is, the vibration directions of the electric fields in each radio wave of the polarized waves PD1, PD3, PD5, and PD7 do not have to be completely in the same direction, and for example, with a direction parallel to the Y-axis as a reference, the vibration direction of each electric field from the reference direction may be inclined by a predetermined angle.

On the other hand, the sub arrays Sb2, Sb4, Sb6, and Sb8 are disposed such that the extending direction GD of the long side LS is parallel to the X-axis direction.

Therefore, a polarized wave PD2 of the sub array Sb2, a polarized wave PD4 of the sub array Sb4, a polarized wave PD6 of the sub array Sb6, and a polarized wave PD8 of the sub array Sb8 are in a direction parallel to the X-axis. That is, the polarized waves PD2, PD4, PD6, and PD8 are the same polarized waves as each other. The polarized wave PD1, PD3, PD5, and PD7 are different from the polarized wave PD2, PD4, PD6, and PD8.

As described above, in the antenna device 120 according to the first embodiment, the plurality of sub arrays Sb are disposed on the support substrate 125, and the radio waves radiated from the plurality of sub arrays Sb are radiated in two directions, the X-axis direction and the Y-axis direction.

Figure 5:
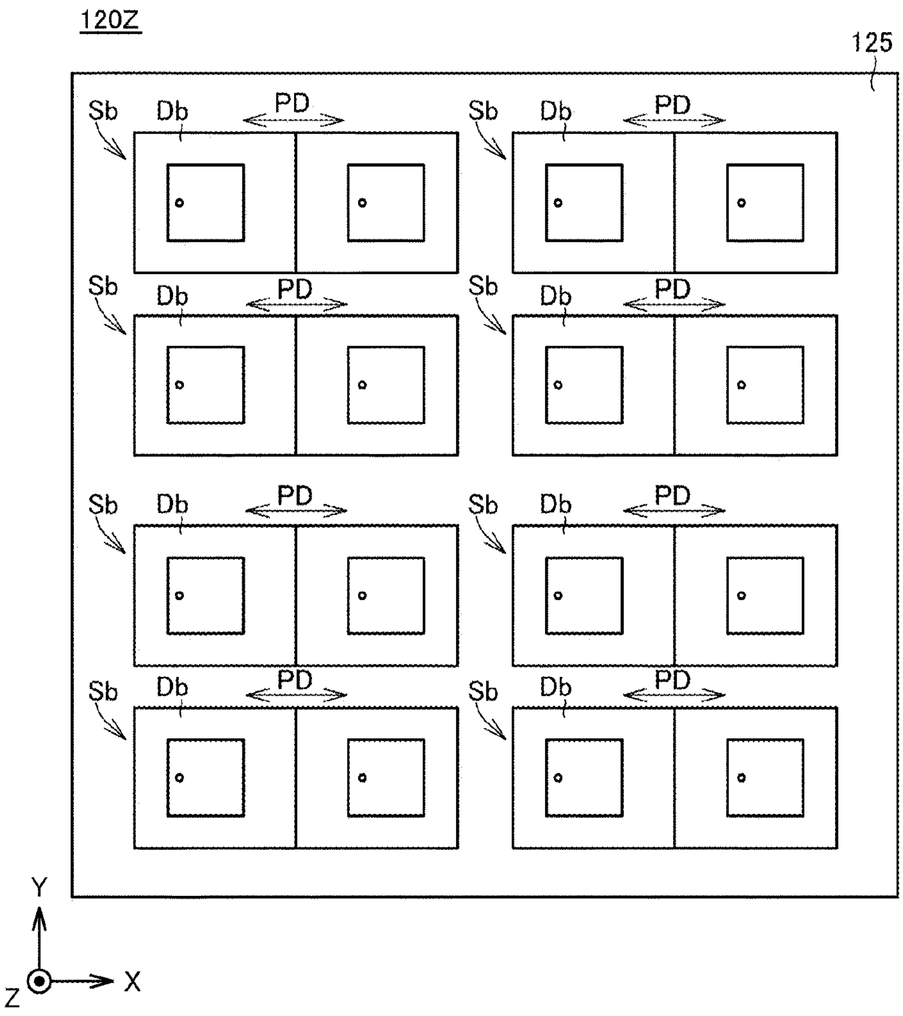
FIG. 5 is a diagram illustrating an antenna device of the comparative example.

FIG. 5 is a diagram illustrating an antenna device 120Z of the comparative example. As shown in FIG. 5, in the antenna device 120Z of the comparative example, all the polarized waves PD of the eight sub arrays Sb on the support substrate 125 are parallel to the X-axis. As described above, the directivity of the sub array Sb as one is unbalanced in the X-axis direction and the Y-axis direction. Therefore, in all the sub arrays Sb on the support substrate 125, the directivity imbalance is generated in the same direction. That is, since all the sub arrays Sb are disposed in the same direction in the comparative example, the directivity of the radiation pattern in the X-axis direction is weaker than the directivity of the radiation pattern in the Y-axis direction in all the sub arrays Sb. As a result, the imbalance of the directivity between the X-axis direction and the Y-axis direction in the antenna device 120Z as a whole is promoted.

On the other hand, in the antenna device 120 according to the first embodiment shown in FIG. 4, the sub arrays Sb1, Sb3, Sb5, and Sb7 and the sub arrays Sb2, Sb4, Sb6, and Sb8 are disposed in different directions. As a result, the imbalance of the directivity in the X-axis direction and the Y-axis direction as the antenna device 120 as a whole is not promoted, and the balance of the directivity in the X-axis direction and the Y-axis direction as the antenna device 120 as a whole is good. That is, the symmetry of the radiation pattern of the antenna device 120 as a whole is improved. As described above, the symmetry of the radiation pattern of the antenna device 120 as a whole is improved in the first embodiment, as compared with a case where all the polarized waves of the plurality of sub arrays Sb on the support substrate 125 are in the same direction, and the characteristics of the antenna device 120 are improved.

Furthermore, in the antenna device 120 according to the first embodiment, the sub arrays Sb1 to Sb4 are disposed rotationally symmetrically. A point CP2 is a point that is the center of the disposition of the sub arrays Sb1 to Sb4 when the support substrate 125 is viewed in plan view. The disposition of the sub arrays Sb1 to Sb4 is the same disposition although rotated by 180 degrees about the point CP2 as an axis. In other words, the disposition of the sub arrays Sb1 to Sb4 is rotationally symmetrical by 180 degrees.

Since the disposition of the sub arrays Sb1 to Sb4 is rotationally symmetrical, the symmetry of the radiation patterns of the sub arrays Sb1 to Sb4 in the Y-axis direction is ensured, and the radiation pattern of the radio waves radiated by the sub arrays Sb1 to Sb4 is improved to be more symmetrical. In addition, in the antenna device 120 according to the first embodiment, the sub arrays Sb1 to Sb8 are rotationally symmetrical by 180 degrees with a point CP3 that is the center of the support substrate 125 as an axis. As a result, the symmetry of the radiation patterns of the sub arrays Sb1 to Sb8 on the support substrate 125 is improved. That is, the symmetry of the radiation pattern of the antenna device 120 as a whole is improved.

The sub arrays Sb1 to Sb4 correspond to the "first sub array to the fourth sub array" of the present disclosure, respectively. At least one of the sub arrays Sb5 to Sb8 corresponds to a "specific sub array" of the present disclosure. The radio waves radiated by the radiation electrodes 131*a* and 131*b* included in the sub array Sb1 correspond to the "radio waves of the first polarized wave" of the present disclosure. The radio waves radiated by the radiation electrodes 132*a* and 132*b* included in the sub array Sb2 correspond to the "radio waves of the second polarized wave" of the present disclosure. The radio waves radiated by the radiation electrodes 133*a* and 133*b* included in the sub array Sb3 correspond to the "radio waves of the third polarized wave" of the present disclosure. The radio waves radiated by the radiation electrodes 134*a* and 134*b* included in the sub array Sb4 correspond to the "radio waves of the fourth polarized wave" of the present disclosure.

In FIG. 4, an example is described in which the radio waves radiated by the radiation electrodes 131*a*, 131*b* to 137*a*, and 137*b* are linearly polarized waves. However, the radio waves radiated from the radiation electrodes 131*a*, 131*b* to 137*a*, and 137*b* may be circularly polarized waves or elliptically polarized waves.

At this time, based on the radio waves radiated by the radiation electrodes 131*a* and 131*b* included in the sub array Sb1 and the radio waves radiated by the radiation electrodes 133*a* and 133*b* included in the sub array Sb3 being right-handed circularly polarized waves, the radio waves radiated by the radiation electrodes 132*a* and 132*b* included in the sub array Sb2 and the radio waves radiated by the radiation electrodes 134*a* and 134*b* included in the sub array Sb4 are left-handed circularly polarized waves.

In addition, based on the radio waves radiated by the radiation electrodes 131*a* and 131*b* included in the sub array Sb1 and the radio waves radiated by the radiation electrodes 133*a* and 133*b* included in the sub array Sb3 being left-handed circularly polarized waves, the radio waves radiated by the radiation electrodes 132*a* and 132*b* included in the sub array Sb2 and the radio waves radiated by the radiation electrodes 134*a* and 134*b* included in the sub array Sb4 are right-handed circularly polarized waves. That is, the polarized wave of the radio waves radiated by the radiation electrodes 131*a*, 131*b*, 133*a*, and 133*b* is different from the polarized wave of the radio waves radiated by the radiation electrodes 132*a*, 132*b*, 134*a*, and 134*b*. Although the radio waves radiated by the radiation electrodes 132*a*, 132*b*, 134*a*, and 134*b* are circularly polarized waves or elliptically polarized waves, the symmetry of the radiation patterns of the sub arrays Sb1 to Sb8 on the support substrate 125 is improved. That is, the symmetry of the radiation pattern of the antenna device 120 as a whole is improved. The case where the two circular polarized waves are different as described above is based on the rotation directions of the two circular polarized waves not matching. On the other hand, the case where the two linearly polarized waves are different is based on the angle at which the two linearly polarized waves intersect being within a predetermined range. The predetermined range is, for example, a range of 30 degrees or more and 90 degrees or less. In the example of FIG. 4, since the intersection angle between the polarized wave PD1 and the polarized wave PD2 is in the range of 30 degrees or more and 90 degrees or less, the polarized wave PD1 and the polarized wave PD2 are different.

Furthermore, since the intersection angle between the polarized wave PD1 and the polarized wave PD2 is 90 degrees, the polarized wave PD1 is an orthogonally polarized wave with respect to the polarized wave PD2. Although the intersection angle of the polarized wave PD1 with respect to the polarized wave PD2 is not completely 90 degrees, for example, as long as the intersection angle is in a range of 60 degrees or more and 90 degrees or less, the polarized wave PD1 may be referred to as an orthogonally polarized wave with respect to the polarized wave PD2.

Second Embodiment

In the antenna device 120 of the first embodiment, a configuration has been described in which the polarized waves PD1, PD3, PD5, and PD7 are in a direction parallel to the Y-axis, and the polarized waves PD2, PD4, PD6, and PD8 are in a direction parallel to the X-axis. In the second embodiment, a configuration in which the symmetry of the radiation pattern of an entire antenna device 120A is improved although the disposition of the sub arrays Sb1 to Sb8 is different from the disposition in the first embodiment will be described. In the antenna device 120A of the second embodiment, the description of the configuration that overlaps that of the antenna device 120 of the first embodiment will not be repeated.

Figure 6:
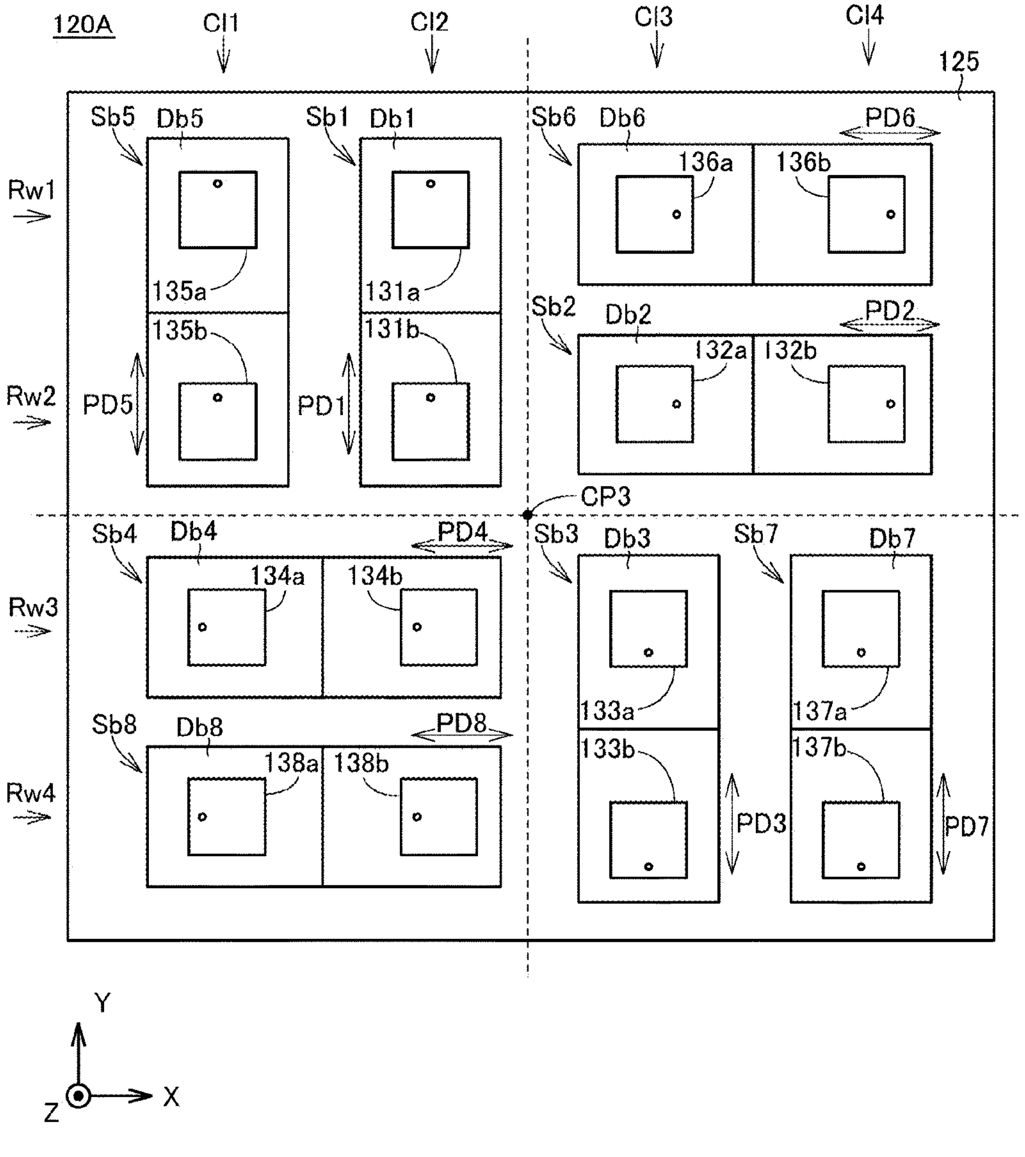
FIG. 6 is a diagram illustrating an antenna device according to a second embodiment.

FIG. 6 is a diagram illustrating the antenna device 120A according to the second embodiment. As shown in FIG. 6, in the antenna device 120A of the second embodiment, similarly to the antenna device 120 according to the first embodiment, the sub array Sb1 to the sub array Sb8 are disposed on the support substrate 125.

The point CP3 is a point indicating the center of the support substrate 125 when the support substrate 125 is viewed in plan view. The focus is on the sub arrays Sb1 to Sb4. The polarized wave PD1 of the sub array Sb1 and the polarized wave PD3 of the sub array Sb3 are in a direction parallel to the Y-axis. The polarized wave PD2 of the sub array Sb2 and the polarized wave PD4 of the sub array Sb4 are in a direction parallel to the X-axis. That is, the polarized waves PD1 and PD3 are in a different direction from the polarized waves PD2 and PD4.

As a result, the radiation patterns of the sub arrays Sb1 to Sb4 are prevented from being biased in directivity to either one of the X-axis and the Y-axis. Furthermore, the disposition of the sub arrays Sb1 to Sb4 is rotationally symmetrical. The disposition of the sub arrays Sb1 to Sb4 is the same disposition each time the disposition is rotated by 90 degrees. Hereinafter, the same disposition each time the disposition is rotated by 90 degrees is simply referred to as "90-degree rotational symmetry". As a result, the symmetry of the radiation patterns of the sub arrays Sb1 to Sb4 disposed as a rotational symmetry of 90 degrees is ensured not only in the Y-axis direction but also in the X-axis direction, so that the symmetry is further improved as compared with the case of a rotational symmetry of 180 degrees illustrated in FIG. 1. In addition, the sub arrays Sb1 to Sb4 in FIG. 6 are rotationally symmetrical including the position of the feeding point of the radiation electrode included in each of the sub arrays Sb1 to Sb4. The phase of the radio wave radiated from the radiation electrode can be adjusted at each individual of the radiation electrodes illustrated in FIG. 6 by adjusting the phase of the radio frequency signal supplied from the RFIC 110.

The focus is on the sub arrays Sb5 to Sb8. The polarized wave PD5 of the sub array Sb5 and the polarized wave PD7 of the sub array Sb7 are in a direction parallel to the Y-axis. The polarized wave PD6 of the sub array Sb6 and the polarized wave PD8 of the sub array Sb8 are in a direction parallel to the X-axis. That is, the polarized waves PD5 and PD7 are in a different direction from the polarized waves PD6 and PD8.

The focus is on the radiation electrodes 131*a*, 131*b* to 138*a*, and 138*b* disposed to form a matrix. In the antenna device 120A in FIG. 6, the radiation electrodes disposed in each of the columns C11 to C14 and each of the rows Rw1 to Rw4 are disposed such that the number of radiation electrodes having different polarized waves is the same. That is, focusing on the row Rw1, the polarized waves of the radiation electrode 135*a* and the radiation electrode 131*a* are parallel to the Y-axis, and the polarized waves of the radiation electrode 136*a* and the radiation electrode 136*b* are parallel to the X-axis. Similarly, focusing on the column C11, the polarized waves of the radiation electrode 135*a* and the radiation electrode 131*b* are parallel to the Y-axis, and the polarized waves of the radiation electrode 134*a* and the radiation electrode 138*b* are parallel to the X-axis. In other words, in each column and each row, the number of radiation electrodes that radiate polarized radio waves of the polarized waves parallel to the X-axis and the number of radiation electrodes that radiate radio waves of the polarized waves parallel to the Y-axis are the same.

As a result, similarly, also in the sub arrays Sb5 to Sb8, the radiation pattern is prevented from being biased in directivity toward either one of the X-axis or the Y-axis, and the symmetry of the radiation pattern is improved. In addition, since the disposition of the sub arrays Sb5 to Sb8 is also rotationally symmetrical by 90 degrees, the symmetry of the radiation patterns of the sub arrays Sb5 to Sb8 is further improved.

Furthermore, in the second embodiment, the disposition of all the sub arrays Sb1 to Sb8 on the support substrate 125 is also rotationally symmetrical by 90 degrees.

As a result, the radiation pattern as a whole of the antenna device 120A of a mobile phone 2 of the embodiment is prevented from being biased in directivity to either one of the X-axis and the Y-axis, and in addition, the symmetry of the radiation pattern is improved.

The sub array Sb5, the sub array Sb1, the sub array Sb6, and the sub array Sb2 can also correspond to the "first sub array", the "second sub array", the "third sub array", and the "fourth sub array" in the present disclosure, respectively.

The antenna device 120A according to the second embodiment may have a configuration that includes the sub arrays Sb1, Sb2, Sb5, and Sb6. In this case, the sub array Sb1 corresponds to the "first sub array" of the present disclosure, the sub array Sb2 corresponds to the "second sub array" of the present disclosure, the sub array Sb5 corresponds to the "third sub array" of the present disclosure, and the sub array Sb6 corresponds to a "fourth sub array" of the present disclosure. That is, the configuration including the sub arrays Sb1, Sb2, Sb5, and Sb6 is a configuration obtained by removing the sub arrays Sb3, Sb4, Sb7, and Sb8 from the configuration illustrated in FIG. 6. In this case, the support substrate 125 does not have to have an area on the negative direction side of the Y-axis from a line parallel to the X-axis direction passing through the point CP3. In other words, the support substrate 125 can have a rectangular shape in which a side along the Y-axis direction is a short side and a side along the X-axis direction is a long side.

In addition, polarized waves of some of the sub array Sb1 to sub array Sb8 included in the antenna device 120A according to the second embodiment do not have to be polarized waves along the extending direction GD. For example, with respect to the sub arrays Sb5, Sb6, Sb7, and Sb8, the disposition of the sub arrays Sb5, Sb6, Sb7, and Sb8 is not moved from the disposition in FIG. 6, and the radiation electrodes 135*a*, 135*b* to 138*a*, and 138*b* on the sub arrays Sb5, Sb6, Sb7, and Sb8 is rotated by 90 degrees. As a result, the polarized waves of the sub arrays Sb5, Sb6, Sb7, and Sb8 are in the directions along the short side directions of the sub arrays Sb5, Sb6, Sb7, and Sb8, respectively. That is, the antenna device 120A may include the sub arrays Sb1 to Sb4 in which the polarized waves are in a direction along the extending direction GD, and the sub arrays Sb5 to Sb8 in which the polarized waves are in a direction orthogonal to the extending direction GD.

Third Embodiment

In the antenna device 120A of the second embodiment, a configuration in which the polarized wave and the arrangement direction of the radiation electrodes included in the sub array Sb are parallel to each other has been described. In the third embodiment, the disposition of the antenna device 120A and each of the sub arrays Sb of the second embodiment is the same, but a configuration in which the polarized wave of each of the sub arrays Sb is inclined with respect to the arrangement direction of the radiation electrodes will be described. In an antenna device 120B of the third embodiment, the description of the configuration that overlaps that of the antenna device 120A of the second embodiment will not be repeated.

Figure 7:
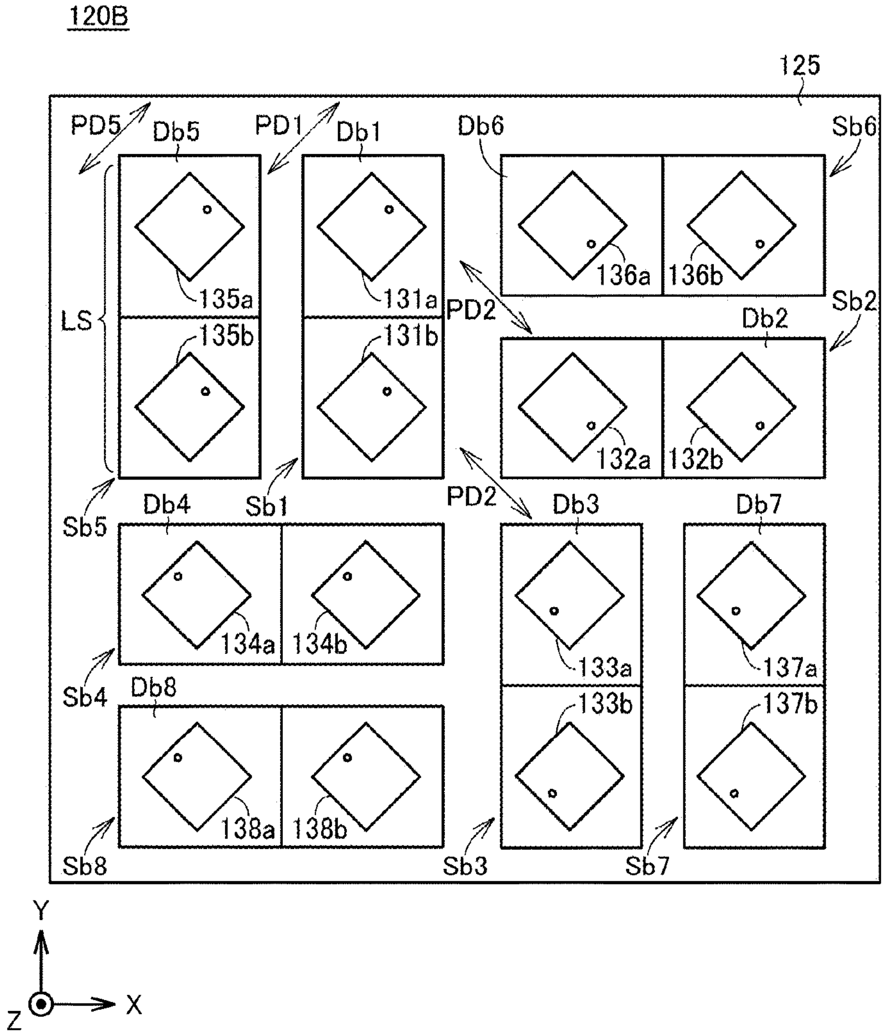
FIG. 7 is a diagram illustrating an antenna device according to a third embodiment.

FIG. 7 is a diagram illustrating the antenna device 120B according to the third embodiment. As shown in FIG. 7, the sub arrays Sb1 to Sb8 are disposed on the support substrate 125. The sub arrays Sb1 to Sb8 have the same disposition as the sub arrays Sb1 to Sb8 in the second embodiment. Focusing on the single sub array Sb1, the radiation electrodes 131*a* and 131*b* included in the sub array Sb1 of the third embodiment are disposed on a dielectric substrate Db1 by rotating the radiation electrodes 131*a* and 131*b* included in the sub array Sb1 of the second embodiment clockwise by 45 degrees.

In other words, the polarized wave PD1 is inclined with respect to the arrangement direction of the radiation electrodes 131*a* and 131*b*. In other words, the polarized wave PD1 is in a direction that intersects the long side LS of the sub array Sb1. Similarly, the polarized waves PD2 to PD8 are in directions that intersect the long sides LS of the sub arrays Sb2 to Sb8, respectively.

The inclination of the polarized wave with respect to the arrangement direction of each radiation electrode may be any angle between 0 and 90 degrees. As shown in FIG. 7, in the third embodiment, the disposition relationship between the radiation electrode and the dielectric substrate can be changed by the inclination of the polarized wave of the radiation electrode. As a result, by adjusting the inclination angle of the radiation electrode, the radiation pattern on a single radiation electrode can be selected to be any radiation pattern.

As described above, the configuration described in the first embodiment is applicable to even a case where the polarized waves of each of the sub arrays Sb are inclined with respect to the arrangement direction of the radiation electrodes as in the third embodiment, so that the symmetry of the radiation pattern of the antenna device 120B as a whole, which is an array antenna, is improved, and the characteristics of the antenna device 120B are improved.

Fourth Embodiment

In the antenna device 120 of the first embodiment, a configuration in which the even number (eight) of the sub arrays Sb is disposed on the support substrate 125 has been described. In the fourth embodiment, a configuration in which an odd number (five) of the sub arrays Sb is disposed on the support substrate 125 will be described. In an antenna device 120C of the fourth embodiment, the description of the configuration that overlaps that of the antenna device 120 of the first embodiment will not be repeated.

Figure 8:
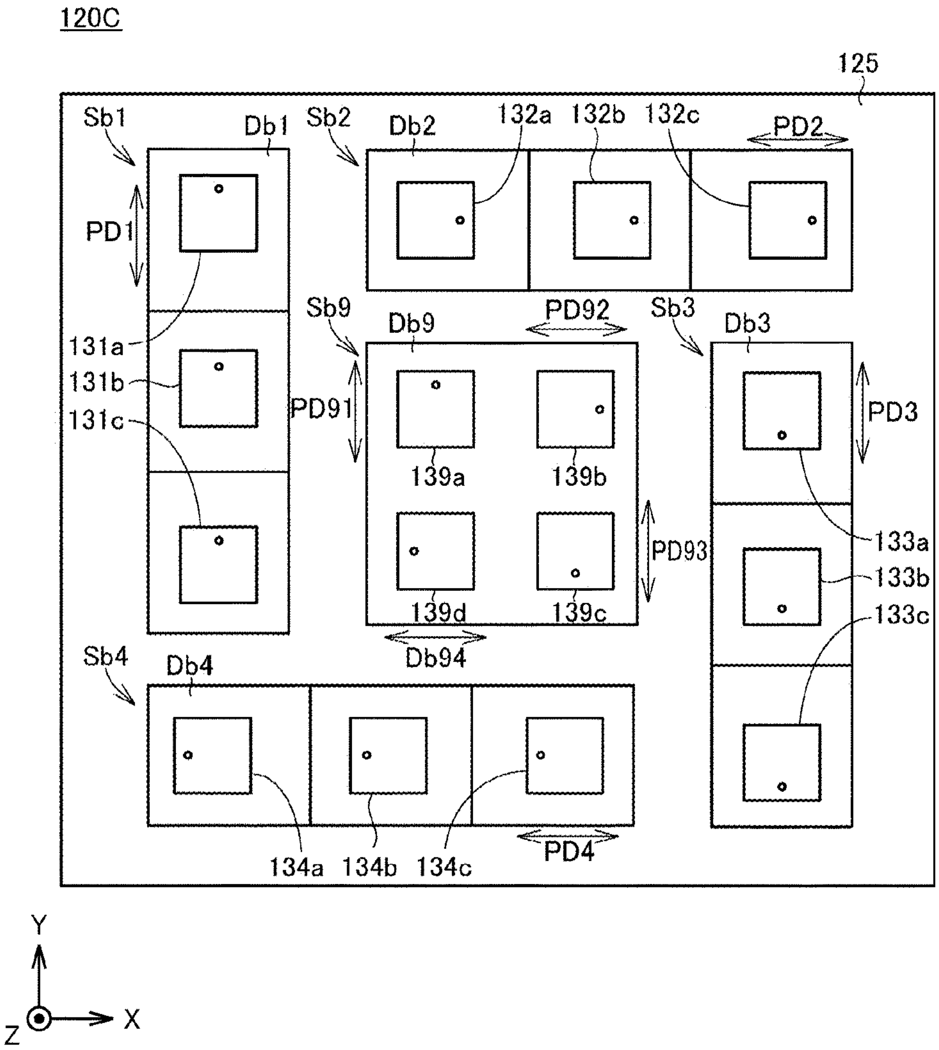
FIG. 8 is a diagram illustrating an antenna device according to a fourth embodiment.

FIG. 8 is a diagram illustrating the antenna device 120C according to the fourth embodiment. As shown in FIG. 8, in the fourth embodiment, the sub arrays Sb1 to Sb4 and a sub array Sb9 are disposed on the support substrate 125. Each of the sub arrays Sb1 to Sb4 has a configuration having three radiation electrodes. For example, the sub array Sb1 has the radiation electrodes 131*a*, 131*b*, and 131*c*.

The radiation electrodes 131*a*, 131*b*, and 131*c* are disposed side by side along the extending direction GD of the long side LS of the dielectric substrate Db1. Although three or more radiation electrodes are disposed in the sub array Sb, as described with reference to FIG. 2, the symmetry of the radiation patterns of the radiation electrodes 131*a* and 131*c* in the Y-axis direction is impaired. Therefore, the directivity of the radiation patterns of the radiation electrodes 131*a*, 131*b*, and 131*c* in the Y-axis direction is decreased as compared with the radiation patterns of the radiation electrodes 131*a*, 131*b*, and 131*c* in the X-axis direction. That is, in the radiation pattern of the sub array Sb1 of the fourth embodiment, a bias in the directivity occurs in the X-axis direction and the Y-axis direction.

In the fourth embodiment, the sub array Sb9 is disposed at the center of the support substrate 125. The sub arrays Sb1 to Sb4 are disposed to surround the sub array Sb9. The sub array Sb1 is disposed on the negative direction side of the X-axis of the sub array Sb9, and the sub array Sb2 is disposed on the positive direction side of the Y-axis of the sub array Sb9. The sub array Sb3 is disposed on the positive direction side of the X-axis of the sub array Sb9, and the sub array Sb4 is disposed on the negative direction side of the Y-axis of the sub array Sb9. In addition, the polarized waves PD1 and PD3 of the sub arrays Sb1 and Sb3 are in a direction parallel to the Y-axis. With such a disposition, the disposition of the sub arrays Sb1 to Sb4 is rotationally symmetrical by 90 degrees.

In other words, when the support substrate 125 is viewed in plan view, the sub array Sb2 is disposed by rotating the sub array Sb1 by 90 degrees. The sub array Sb3 is disposed by rotating the sub array Sb2 by 90 degrees. The sub array Sb4 is disposed by rotating the sub array Sb3 by 90 degrees. The sub array Sb1 is disposed by rotating the sub array Sb4 by 90 degrees.

The sub array Sb9 has radiation electrodes 139*a*, 139*b*, 139*c*, and 139*d*. The radiation electrodes 139*a*, 139*b*, 139*c*, and 139*d* are configured to be able to radiate radio waves of the polarized waves PD91, PD92, PD93, and PD94, respectively. That is, the sub array Sb9 has a shape that is rotationally symmetrical by 90 degrees about the center of the sub array Sb9 as an axis when the sub array Sb9 is viewed in plan view. Therefore, the sub arrays Sb1 to Sb4 and Sb9 disposed on the support substrate 125 are disposed in a rotational symmetry of 90 degrees. In the example illustrated in FIG. 8, the sub arrays Sb1 to Sb4 and the sub array Sb9 have different shapes, but may have the same shape.

As described above, the configuration described in the first embodiment is applicable to even a case where the number of the sub arrays Sb disposed on the support substrate 125 is an odd number as in the fourth embodiment, so that the symmetry of the radiation pattern of the antenna device 120C, which is an array antenna, as a whole is improved, and the characteristics of the antenna device 120C are improved. The sub array Sb9 corresponds to a "fifth sub array" in the present disclosure.

Fifth Embodiment

In the antenna device 120C of the fourth embodiment, a configuration in which the sub arrays Sb1 to Sb4 have the same shape has been described. In the fifth embodiment, a configuration in which the sub arrays Sb1 and Sb3 and the sub arrays Sb2 and Sb4 have different shapes will be described. In an antenna device 120D of the fifth embodiment, the description of the configuration that overlaps that of the antenna device 120 of the first embodiment or the antenna device 120C of the fourth embodiment will not be repeated.

Figure 9:
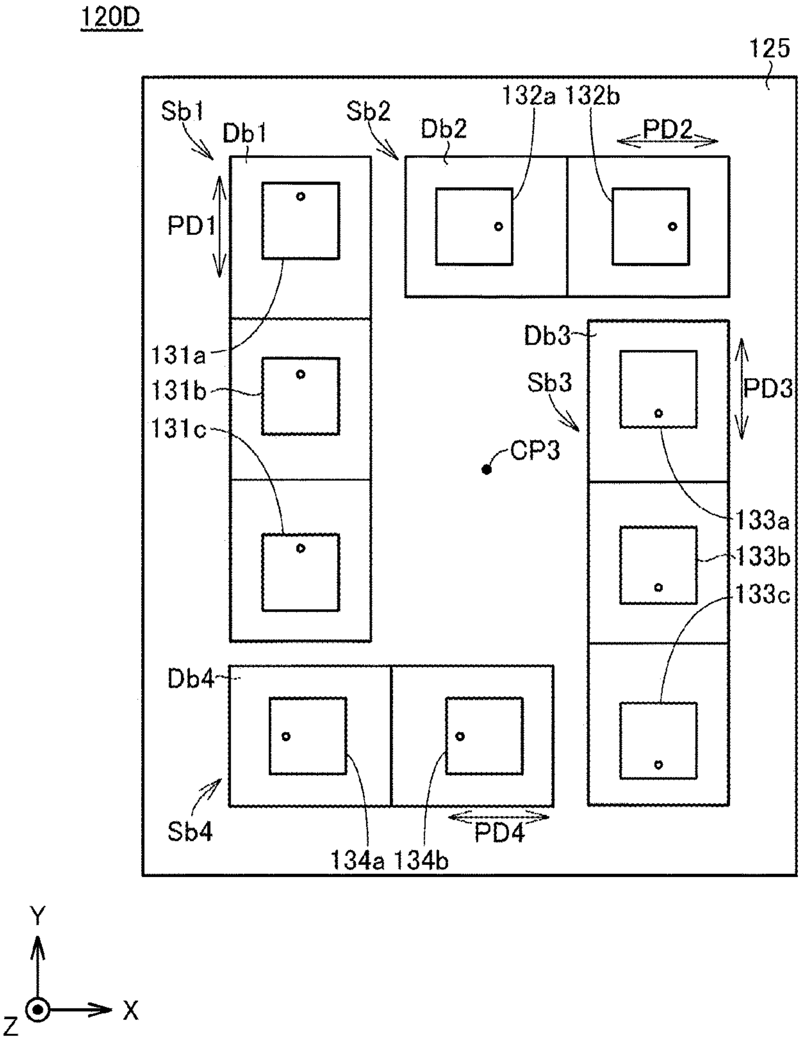
FIG. 9 is a diagram illustrating an antenna device according to a fifth embodiment.

FIG. 9 is a diagram illustrating the antenna device 120D according to the fifth embodiment. As shown in FIG. 9, the sub arrays Sb1 to Sb4 are disposed on the support substrate 125. The sub arrays Sb1 and Sb3 have three radiation electrodes.

The sub arrays Sb2 and Sb4 have two radiation electrodes. In other words, the sub array Sb1 has a number of radiation electrodes different from the number of radiation electrodes disposed in the sub array Sb2.

As shown in FIG. 9, the sub array Sb1 is disposed on the positive direction side of the Y-axis on the support substrate 125 and on the negative direction side of the X-axis. The sub array Sb2 is disposed on the positive direction side of the Y-axis on the support substrate 125 and on the positive direction side of the X-axis.

The sub array Sb3 is disposed on the negative direction side of the Y-axis on the support substrate 125 and on the positive direction side of the X-axis. The sub array Sb4 is disposed on the negative direction side of the Y-axis on the support substrate 125 and on the negative direction side of the X-axis. As a result, the sub arrays Sb1 to Sb4 are disposed in a rotational symmetry of 180 degrees from the center of the support substrate 125.

As a result, as the single sub array Sb, although there is a bias in the directivity of the radiation pattern between the Y-axis and the X-axis, the symmetry of the radiation pattern of the antenna device 120D as a whole is improved, and the characteristics of the antenna device 120D are improved. The number of radiation electrodes included in the sub arrays Sb1 and Sb3 may be four or more. In addition, the number of radiation electrodes included in the sub arrays Sb2 and Sb4 may be three or more. In addition, in the example illustrated in FIG. 9, the sub arrays Sb1 and Sb3 and the sub arrays Sb2 and Sb4 may have different shapes, but may have the same shape. For example, the sub arrays Sb2 and Sb4 may have the same shape as the sub array Sb1 and may include two radiation electrodes.

In the first to fifth embodiments, an example in which two or more radiation electrodes are disposed in the sub array Sb is described, but based on the disposition of the sub array Sb being offset from the center point of the dielectric substrate, a bias may occur in the polarized waves of the sub array Sb as one. That is, the configuration of the present embodiment is applicable to even a case where the sub array Sb has a single radiation electrode. For example, a configuration or the like in which the radiation electrode 130*a* is removed from the configuration illustrated in FIG. 2(A) can be considered.

Sixth Embodiment

In the antenna device 120A of the second embodiment, an example in which the feeding points of the radiation electrodes disposed in adjacent sub arrays among the sub arrays that radiate radio waves having the same polarized wave, are offset in the same direction has been described. For example, in the second embodiment, the feeding points of all the radiation electrodes disposed in the sub array Sb1 and the sub array Sb5 that are adjacent are disposed at positions offset in the positive direction of the Y-axis with respect to the center of each radiation electrode. However, the feeding points of the radiation electrodes of the adjacent sub arrays may be offset in different directions.

In the sixth embodiment, a configuration in which the feeding points of the radiation electrodes of adjacent sub arrays are offset in different directions will be described. In an antenna device 120E of the sixth embodiment, the description of the configuration that overlaps that of the antenna device 120A of the second embodiment will not be repeated.

Figure 10:
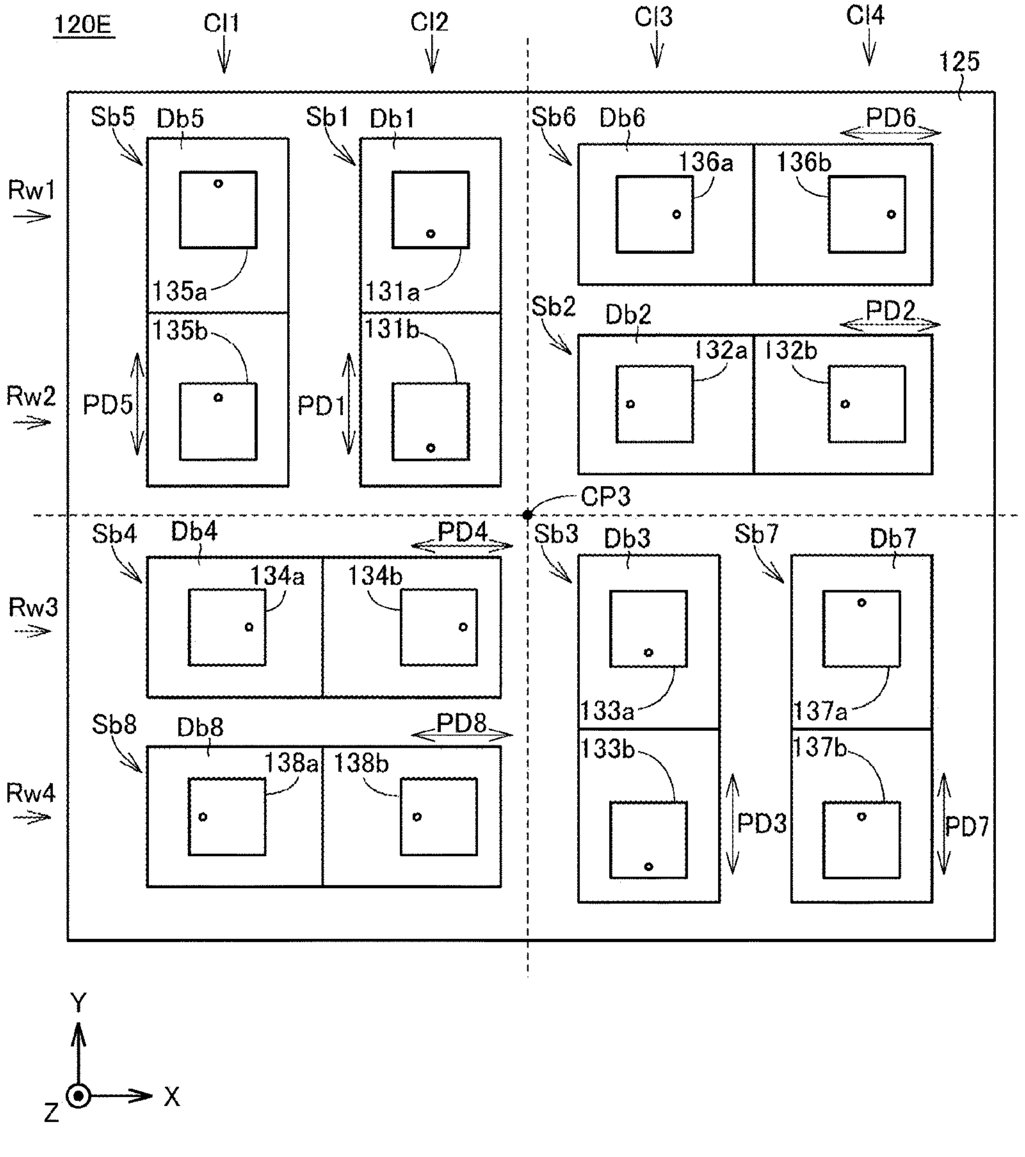
FIG. 10 is a diagram illustrating an antenna device according to a sixth embodiment.

FIG. 10 is a diagram illustrating the antenna device 120E according to the sixth embodiment.

As shown in FIG. 10, the feeding points of the radiation electrodes 135*a* and 135*b* disposed in the sub array Sb5 are offset from the center to the positive direction side of the Y-axis. On the other hand, the feeding points of the radiation electrodes 131*a* and 131*b* disposed in the sub array Sb1 adjacent to the sub array Sb5 are offset from the center to the negative direction side of the Y-axis. In addition, the feeding points of the radiation electrodes 136*a* and 136*b* disposed in the sub array Sb6 are offset from the center to the positive direction side of the X-axis. On the other hand, the feeding points of the radiation electrodes 132*a* and 132*b* disposed in the sub array Sb2 adjacent to the sub array Sb6 are offset from the center to the negative direction side of the X-axis.

Furthermore, the feeding points of the radiation electrodes 133*a* and 133*b* disposed in the sub array Sb3 are offset from the center to the negative direction side of the Y-axis. On the other hand, the feeding points of the radiation electrodes 137*a* and 137*b* disposed in the sub array Sb7 adjacent to the sub array Sb3 are offset from the center to the positive direction side of the Y-axis. In addition, the feeding points of the radiation electrodes 134*a* and 134*b* disposed in the sub array Sb4 are offset from the center to the positive direction side of the X-axis. On the other hand, the feeding points of the radiation electrodes 138*a* and 138*b* disposed in the sub array Sb8 adjacent to the sub array Sb4 are offset from the center to the negative direction side of the X-axis.

As described above, the feeding points of the radiation electrodes may be offset in different directions between the adjacent sub arrays that radiate radio waves having the same polarized wave. In the sixth embodiment, the sub arrays Sb1 to Sb8 disposed on the support substrate 125 are disposed in a rotational symmetry of 90 degrees except for the disposition of the feeding points, so that the symmetry of the radiation patterns of the sub arrays Sb1 to Sb8 on the support substrate 125 is improved. That is, the symmetry of the radiation pattern in the entire antenna device 120E is improved.

Seventh Embodiment

In the antenna device 120E of the sixth embodiment, the sub arrays Sb1 and Sb5 are disposed on the negative direction side of the X-axis and on the positive direction side of the Y-axis from the center point CP3, and the sub arrays Sb3 and Sb7 are disposed on the positive direction side of the X-axis and on the negative direction side of the Y-axis from the center point CP3. In other words, the disposition of the sub arrays Sb1 and Sb5 and the disposition of the sub arrays Sb3 and Sb7 are point-symmetrical with the center point C3 as the origin.

However, the disposition of the sub arrays Sb1 and Sb5 and the disposition of the sub arrays Sb3 and Sb7 may be disposed not to be point-symmetric with the center point C3 as the origin.

In the seventh embodiment, a configuration in which the disposition of the sub arrays Sb1 and Sb5 and the disposition of the sub arrays Sb3 and Sb7 are line symmetrical with respect to a straight line parallel to the X-axis passing through the center point C3 will be described. In an antenna device 120F of the seventh embodiment, the description of the configuration that overlaps that of the antenna device 120E of the sixth embodiment will not be repeated.

Figure 11:
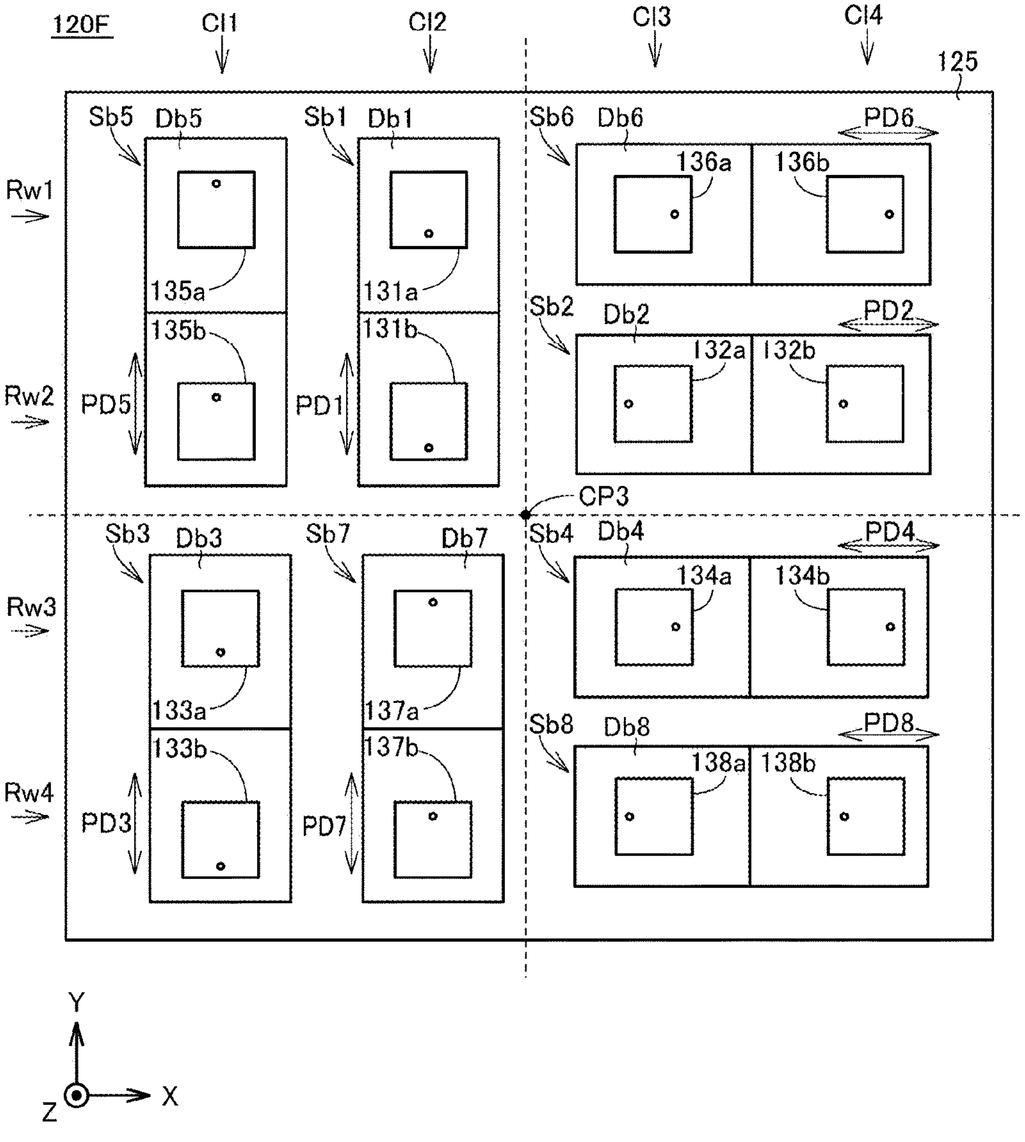
FIG. 11 is a diagram illustrating an antenna device according to a seventh embodiment.

FIG. 11 is a diagram illustrating the antenna device 120F according to the seventh embodiment.

As shown in FIG. 11, the disposition of the sub arrays Sb1 and Sb5 and the disposition of the sub arrays Sb3 and Sb7 are line symmetrical with respect to a straight line parallel to the X-axis passing through the center point C3. Similarly, the disposition of the sub arrays Sb2 and Sb6 and the disposition of the sub arrays Sb4 and Sb8 are line-symmetric with respect to a straight line parallel to the X-axis passing through the center point C3.

When the configuration illustrated in FIG. 11 and the configuration illustrated in FIG. 10 are compared, the distance between the sub array Sb1 and Sb5 and the sub array Sb3 and Sb7 in FIG. 11 is smaller than the distance between the sub array Sb1 and Sb5 and the sub array Sb3 and Sb7 in FIG. 10. In the array antenna, based on the interval between the respective radiation electrodes being large, a grating lobe may be generated. In the antenna device 120F of FIG. 11, as compared with FIG. 10, the distance between the sub arrays Sb1 and Sb5 and the sub array Sb3 and Sb7 is smaller, so that it is possible to suppress the generation of grating lobes in the radio waves radiated by the sub arrays Sb1 and Sb5 and the sub arrays Sb3 and Sb7.

Similarly, in the antenna device 120F of FIG. 11, as compared with FIG. 10, the distance between the sub arrays Sb2 and Sb6 and the sub array Sb4 and Sb8 is smaller, so that it is possible to suppress the generation of grating lobes in the radio waves radiated by the sub arrays Sb2 and Sb6 and the sub arrays Sb4 and Sb8. In addition, as illustrated in the comparative example in FIG. 5, since the polarized waves of the radio waves radiated by all the radiation electrodes are not the same, the symmetry of the radiation patterns of the sub arrays Sb1 to Sb8 on the support substrate 125 is improved. That is, the symmetry of the radiation pattern of the antenna device 120F as a whole is improved.

The embodiment disclosed this time should be considered to be an example and not restrictive in all respects. The scope of the present disclosure is indicated by the claims rather than the description of the above-described embodiment, and is intended to include all changes within the meaning and range of equivalents to the claims.

REFERENCE SIGNS LIST

10 COMMUNICATION DEVICE
100 ANTENNA MODULE
110 RFIC
111A to 111D, 113A to 113D, 117 SWITCH
112AR to 112DR LOW NOISE AMPLIFIER
112AT to 112DT POWER AMPLIFIER
114A to 114D ATTENUATOR
115A to 115D PHASE SHIFTER
116 SIGNAL MULTIPLEXING/BRANCHING FILTER
118 MIXER
119 AMPLIFIER CIRCUIT
120, 120A to 120F, 120Z ANTENNA DEVICE
125 SUPPORT SUBSTRATE
126 DIELECTRIC
GND GROUND ELECTRODE
130S1, 130S2, 130*a*, 130*b*, 131*a* to 131*c*, 132*a* to 132*c*, 133*a* to 133*c*, 134*a* to 134*c*, 139*a* to 139*d* RADIATION ELECTRODE
200 BBIC
CP1 to CP3 POINT
db, Db1 to Db3, DbS DIELECTRIC SUBSTRATE
GD EXTENDING DIRECTION
SS SHORT SIDE
LS LONG SIDE
PD, PD1 to PD8, PD91 to PD94 POLARIZED WAVE
SL1 to SL6 INTERVAL
SP, SP1, SP2 FEEDING POINT
Sb, Sb1 to Sb9, SbS, SbS1, SbS2 SUB ARRAY
XL, YL LINE
C11 to C14 ROW
Rw1 to Rw4 COLUMN

The invention claimed is:

1. An antenna module comprising:
a flat support substrate; and
a first sub array, a second sub array, a third sub array, and a fourth sub array that are disposed on the support substrate, wherein each of the first sub array, the second sub array, the third sub array, and the fourth sub array includes a respective rectangular substrate having a long side and a short side based on the support substrate being viewed in plan view, wherein
each of the first sub array, the second sub array, the third sub array, and the fourth sub array includes a plurality of radiation electrodes disposed along an extending direction of the long side, each of the plurality of radiation electrodes having different feed points from one another on the respective rectangular substrate,
in each of the first, second, third, and fourth sub-arrays, at least one of the plurality of radiation electrodes is offset from a center of the respective rectangular substrate,
in each of the first, second, third, and fourth sub-arrays, at least one of the plurality of radiation electrodes has a feed point offset from the respective radiating element,
the first sub array is configured to radiate radio waves of a first polarized wave,
the second sub array is configured to radiate radio waves of a second polarized wave,
the third sub array is configured to radiate radio waves of a third polarized wave,
the fourth sub array is configured to radiate radio waves of a fourth polarized wave,
the first polarized wave is different from the second polarized wave,
the third polarized wave is different from the fourth polarized wave,
the first polarized wave is the same as the third polarized wave, and
the second polarized wave is the same as the fourth polarized wave.

2. The antenna module according to claim 1,
wherein the first sub array has the same shape as a shape of the second sub array.

3. The antenna module according to claim 2, wherein the first sub array to the fourth sub array are disposed in rotational symmetry based on the support substrate being viewed in plan view.

4. The antenna module according to claim 2, further comprising:

a fifth sub array disposed on the support substrate, wherein the fifth sub array includes a first radiation electrode that is configured to radiate radio waves of the first polarized wave, a second radiation electrode that is configured to radiate radio waves of the second polarized wave, a third radiation electrode that is configured to radiate radio waves of the third polarized wave, and a fourth radiation electrode that is configured to radiate radio waves of the fourth polarized wave.

5. The antenna module according to claim 3, wherein the first sub array to the fourth sub array are disposed in a rotational symmetry of 180 degrees based on the support substrate being viewed in plan view.

6. The antenna module according to claim 3, wherein the first sub array to the fourth sub array are disposed in a rotational symmetry of 90 degrees based on the support substrate being viewed in plan view.

7. The antenna module according to claim 6, further comprising:

at least one specific sub array, wherein the specific sub array includes the plurality of radiation electrodes, the radiation electrodes included in each of the first sub array to the fourth sub array and the specific sub array are disposed to form a matrix on the support substrate, the number of rows and the number of columns in the matrix are the same number, and the radiation electrodes are disposed in each row and each column of the matrix such that the number of the radiation electrodes that radiate radio waves of the first polarized wave and the number of the radiation electrodes that radiate radio waves of the second polarized wave are the same number.

8. The antenna module according to claim 7, further comprising:

a fifth sub array disposed on the support substrate, wherein the fifth sub array includes a first radiation electrode that is configured to radiate radio waves of the first polarized wave, a second radiation electrode that is configured to radiate radio waves of the second polarized wave, a third radiation electrode that is configured to radiate radio waves of the third polarized wave, and a fourth radiation electrode that is configured to radiate radio waves of the fourth polarized wave.

9. The antenna module according to claim 8, wherein the first sub array to the fifth sub array are disposed in rotational symmetry based on the support substrate being viewed in plan view.

10. The antenna module according to claim 9, wherein the first polarized wave and the second polarized wave are linearly polarized waves.

11. The antenna module according to claim 10, wherein the first polarized wave intersects a long side of the first sub array, and the second polarized wave intersects a long side of the second sub array.

12. The antenna module according to claim 10, wherein the first polarized wave is parallel to the extending direction of the long side of the first sub array, and the second polarized wave is parallel to the extending direction of the long side of the second sub array.

13. The antenna module according to claim 12, wherein the first sub array has the number of the radiation electrodes different from the number of the radiation electrodes disposed in the second sub array.

14. The antenna module according to claim 13, wherein all of the respective sub arrays disposed on the support substrate have the same shape as each other.

15. The antenna module according to claim 1, wherein the first sub array to the fourth sub array are disposed in rotational symmetry based on the support substrate being viewed in plan view.

16. The antenna module according to claim 1, wherein the first sub array to the fourth sub array are disposed in a rotational symmetry of 180 degrees based on the support substrate being viewed in plan view.

17. The antenna module according to claim 1, wherein the first sub array to the fourth sub array are disposed in a rotational symmetry of 90 degrees based on the support substrate being viewed in plan view.

18. The antenna module according to claim 1, further comprising:

at least one specific sub array, wherein the specific sub array includes the plurality of radiation electrodes, the radiation electrodes included in each of the first sub array to the fourth sub array and the specific sub array are disposed to form a matrix on the support substrate, the number of rows and the number of columns in the matrix are the same number, and the radiation electrodes are disposed in each row and each column of the matrix such that the number of the radiation electrodes that radiate radio waves of the first polarized wave and the number of the radiation electrodes that radiate radio waves of the second polarized wave are the same number.

19. The antenna module according to claim 1, wherein the first sub array has the number of the radiation electrodes different from the number of the radiation electrodes disposed in the second sub array.

20. The antenna module according to claim 1, wherein all of the respective sub arrays disposed on the support substrate have the same shape as each other.

* * * * *